United States Patent [19]

Dixon

[11] 4,023,474
[45] May 17, 1977

[54] CAMPING TOASTER

[76] Inventor: Robert C. Dixon, 128 Colorado Ave., Idaho Springs, Colo. 80452

[22] Filed: Jan. 8, 1976

[21] Appl. No.: 647,585

[52] U.S. Cl. .................................. 99/393; 99/402; 126/9 R
[51] Int. Cl.² ........................................ A47J 37/08
[58] Field of Search ............ 99/385, 372, 375, 376, 99/377, 389, 392–393, 394–395, 400–401, 402, 422, 450; 126/9, 14, 25, 38, 41

[56] References Cited

UNITED STATES PATENTS

| | | | |
|---|---|---|---|
| 1,105,230 | 7/1914 | Wiltsie | 99/395 |
| 1,279,144 | 9/1918 | Pattison | 99/400 X |
| 1,502,894 | 7/1924 | Anschutz | 99/422 |
| 1,639,403 | 8/1927 | Fitzgerald | 99/393 |
| 2,596,329 | 5/1952 | Egbert | 99/401 X |
| 2,619,951 | 12/1952 | Kahn | 126/25 R |
| 2,760,427 | 8/1956 | Alberhasky | 126/25 R X |
| 3,062,127 | 11/1962 | Lang | 99/393 |
| 3,220,335 | 11/1965 | Rodrigue | 99/394 |
| 3,384,066 | 5/1968 | Tufts | 126/9 R |

FOREIGN PATENTS OR APPLICATIONS 815,238 10/1951 Germany .............................. 99/385

Primary Examiner—Harvey C. Hornsby
Assistant Examiner—Arthur O. Henderson
Attorney, Agent, or Firm—Van Valkenburgh and Lowe

[57] ABSTRACT

A device for toasting bread or other toastable food items over a fire or camping stove, particularly over butane type burners, consisting of two hinged plates with a series of various size holes therethrough with the plates designed to rest over the stove or fire in the shape of a triangle, with the plates being provided with grids to support the toasted item near but away from the plates, with each plate also being provided with a flange to support the toasted item at a predetermined distance above the heat. The toaster is also provided with a heat shield on each side of the toaster consisting of a metal plate which is hingably attached to one of the toasting plates and is snapped onto the other toasting plate to maintain the toasting plates in an open position during toasting, with the heating plates diverting the heat from the stove or fire to the inside surfaces of the toasting plates. The combination of toasting plates and heating plates is collapsible for easy storage of the camping toaster when not in use.

4 Claims, 5 Drawing Figures

U.S. Patent    May 17, 1977    4,023,474
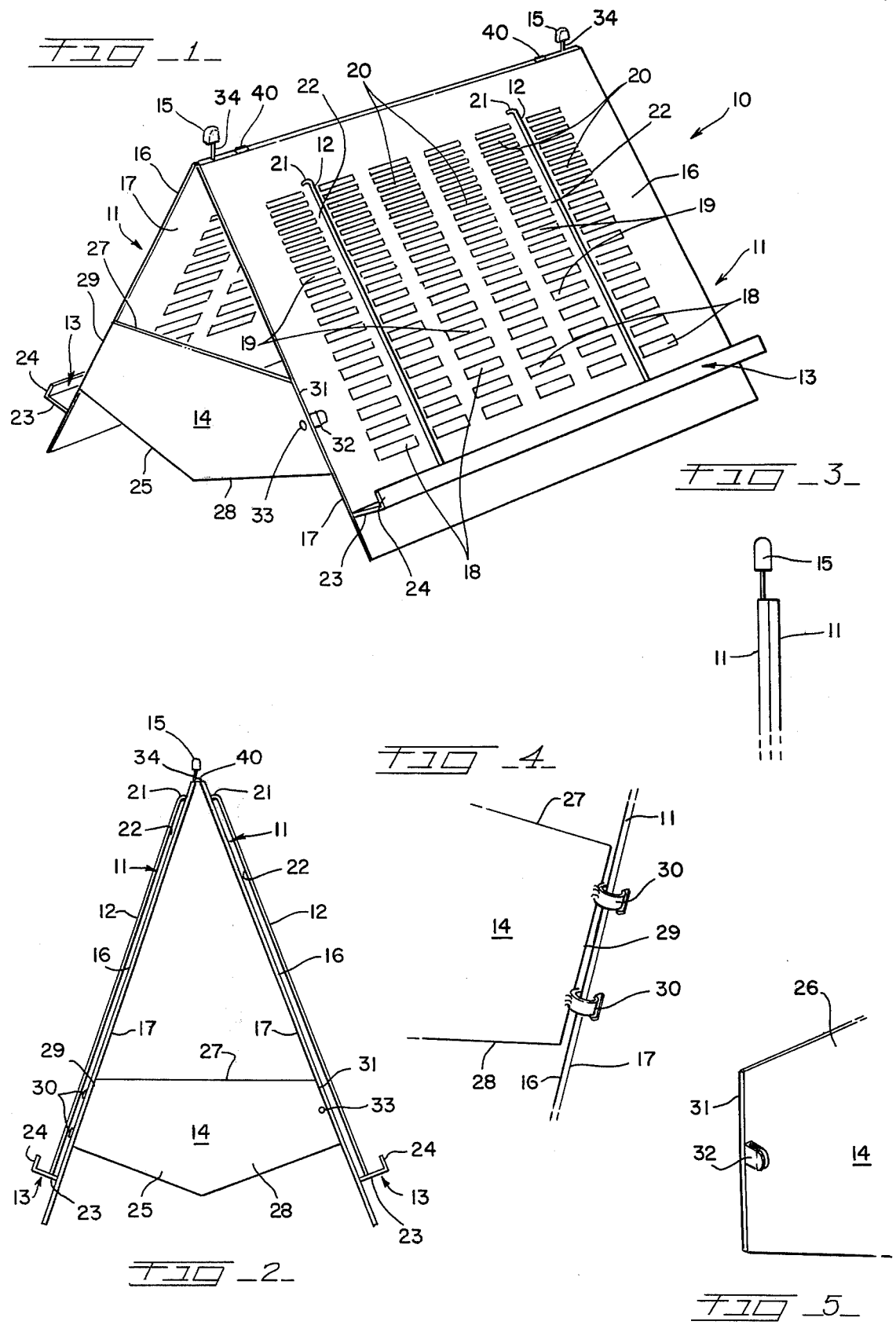

CAMPING TOASTER

BACKGROUND OF THE INVENTION

1. Field of the Invention

This invention relates to a camping toaster for the toasting of bread or other toastable food items over a stove or fire, particularly over butane type burners as used in campers, camping trailers, mobile homes, boats and the like.

2. Description of the Prior Art

It has always been a problem and inconvenience for campers to toast bread or other toastable items while in their recreational vehicle or at campsites, this usually being done by placing the item to be toasted directly onto the grill over the fire or on a solid sheet such as a cooking pan, thereby causing the food item to be easily burnt or charred from excessive and undue heat, and, if an individual tries to manually grasp the toasted item after toasting, also causing burns to the individual's hand. Other devices have been described for use by campers to toast bread or other toastable food items over camping stoves or fires, but, in all cases, the bread or other item to be toasted is rested directly onto the cooking surface, or the device is cumbersome and non-collapsable, or there are no arrangements made for removal of the toaster from the stove or flame without the need to manually grasp a heated surface. There is thus a need for a camper's toaster that will properly toast the food item without burning of the same, a toaster which is collapsable and easily stored in the compact confines of a camping trailer or tent, as well as a toaster that can be manually removed from the hot surface without danger to the camper.

SUMMARY OF THE INVENTION

The present invention provides a novel camper's toaster for the toasting of bread and other toastable food items for toasting of food items properly without burning and which is easily collapsable for storage of the toaster.

It is a feature of the present invention to provide a camper's toaster.

A further feature of the present invention provides a camper's toaster which is easy and safe to use by a camper.

Yet still a further feature of the present invention provides a camper's toaster which is of a rugged and durable construction and which, therefore, may be guaranteed by the manufacturer to withstand rough and continual usage.

Other features of this invention will be apparent during the course of the following description.

BRIEF DESCRIPTION OF THE DRAWINGS

In the accompanying drawings forming a part of this specificaton, and in which like reference characters are employed to designate like parts throughout the same:

FIG. 1 is a perspective view of the camper's toaster in an open position ready for use; and FIG. 2 is a side view of the camper's toaster in an open position; and FIG. 3 is a side view of an insulated finger grip attached to the top of the toaster; and FIG. 4 is a perspective view of the hinged end of a heat shield; and FIG. 5 is a perspective view of a heat shield snap attached to one end of the heat shield.

DESCRIPTION OF THE PREFERRED EMBODIMENT

Referring now to the drawings in detail, there is illustrated a preferred form of the camper's toaster constructed in accordance with the principles of the present invention and which is designated generally in its entirety by the reference numeral 10 and which is comprises of two toasting plates 11 to which are affixed the toasting grids 12 and flange 13, two heat shields 14, two handles 15, and associated components and hardware as will be later described.

The toasting plates 11 are constructed of durable and preferably rust-resistant material, such as plated steel, consisting of an outside surface 16 and an inside surface 17 with the suggested dimensions of the toasting plates 11 being in the neighborhood of 7 inches long × 6 inches high of a suitable thickness such as is used with other types of toasters. As shown in FIG. 1, the toasting plates 11 are provided with a series of rows of through slotted rectangular holes beginning with a series of larger holes 18 toward the bottom of the toasting plates 11 and progressing upwardly to a series of smaller holes 19 to the smallest holes 20 toward the top of the toasting plates 11.

The toasting grids 12 are constructed of rust-resistant wire rod material and are formed on one end to provide a curved surface 21 which is securely affixed, such as by welding, to the toasting plates 11 as shown in FIG. 1, with the opposite end of the toasting grid 12 securely affixed, such as by welding, to the flange 13, thereby providing an opening or space 22 between the toasting plates 11 and the toasting grids 12. The toasting grids 12 are spaced apart along the width of the toasting plates 11 to provide a convenient support for the food item to be toasted.

The flange 13 is also constructed of durable rust-resistant material and, as shown in FIGS. 1 and 2, consists of a horizontal surface 23 and a vertical surface 24 which is formed perpendicularly to the horizontal surface 23, with the end of the horizontal surface 23 being securely affixed, such as by welding, to the toasting plate 11 at a distance predetermined from the bottom of the toasting plate 11 to mimimize burning of the food item while toasting with the recommended distance from the bottom of the toasting plate 11 to the horizontal surface 23 of the flange 13 being approximately ¾ inches. The vertical surface is to hold toast in place upon the flange 13.

The heat shield 14 partially enclose each end of the toaster when it is open as shown at FIG. 1, and are also constructed of rust-resistant material consisting of an outside surface 25 and an inside surface 26, a flat top surface 27, a bottom arched surface 28, an end surface 29 which is secured to the side of one of the toasting plates 11 by means of conventional type hinges 30, and an end surface 31 to which is attached a conventional metal snap 32 by means of a rivet 33. The hinges 30 are illustrated as being comparatively loose rings in slots and with such, the heat shields 14 may be folded over the toaster plates 11 to lie flatly upon the grids 12 and be spaced a short distance from the toaster plates 12 but in spaced parallelism therewith. Spacer hinges to perform such a function are well known. The end surfaces 29 and 31 of the heat shields 14 are formed obliquely to match the angle formed by the toasting plates when in the open position, with the bottom edges of the two toasting plates 11 to be spaced apart a recommended distance of approximately 5 inches to 6 inches for suitably resting on top of a typical butane type burner commonly used in recreational trailers, boats, and the like.

The handles 15 are constructed of a durable plastic and are connected to the top of the toasting plates 11 by means of a thin durable metal wire 34 with one end of the wire 34 being integrally molded with the plastic handle 15 on one end and securely attached, such as by welding, to the top of the toasting plates 11 on the other end, with the handles 15 being provided one each near opposite ends of the camping toaster.

In operation, the camping toaster 10 is stored compactly with the heat shield 14 having its outside surface 25 rotated about the hinges 30 so that the heat shield 14 is turned around to the outside surface 16 of one of the toasting plates 11, and with the toasting plates 11 being pushed together hingeably by means of the hinges 40 attached in a conventional way to the top of the toasting plates 11 so that the inside surfaces 17 ar placed together. In order to use the camping toaster 10, the toasting plates 11 are spread apart at their bottom edges by means of the hinges 40, the heat shields 14 are rotated on the hinges 30 so as to align the end surface 31 of each heat shield 14 to the side of the toasting plate 11 and each heat shield is snapped into place thereon by means of a snap 32. The camping toaster 10 is then a tent shaped unit. It is placed over the stove or fire in an upright position so that the bread or other toastable food item is placed on each side of the toaster so as to rest in an upright, inclined position on the toasting grids 12 and being supported on the horizontal surface 23 of the flange 13. The vertical surface 24 of the flange 13 functions as a lip to prevent the inclined piece of toast from slipping off the flange 13. Heat from the stove or fire rises underneath the toasting plates 11 in the open positon and is deflected by the inside surfaces 26 of the heat shields 14 internally of the camping toaster 10 and, since the heat continues to rise, the heat is evenly dispersed along the height of the inside surfaces 17 of the toasting plates 11 by the heat having greater access through the larger holes 18 which are positioned toward the bottom of the toasting plates 11 and with diminishing access through the holes 19 and 20 as the heat rises. When the bread or other food item is toasted on one side, it may then be turned over onto its opposite side for repetition of the same procedure. When the camper is finished using the camping toaster 10, the metal wires 34 are thin in order to minimize conductance of heat to the plastic handles 15, so that the handles 15 can be grasped between the fingers for movement of the camping toaster 10 away from the stove or fire without danger of burning the individual's hand. After the camping toaster 10 has cooled off, the camping toaster 10 can then be folded into a compact position by reversing the procedure described above.

There is thus described a unique camping toaster which meets all of its stated objectives and which overcomes all of the disadvantages of existing methods.

It is to be understood that the form of this invention as shown and described is to be taken as a preferred example thereof, and that this invention is not to be limited to the exact arrangement of parts described in the description or illustrated in the drawings as changes thereof pertaining to size, shape and arrangement of parts thereof are envisioned within the scope of the invention without departing from the novel concepts of the invention.

Having thus described the invention, what is claimed is:

1. A collapsible toaster for use over an open burner, constituting a flat package in its folded position, and a tent-shaped unit in its open position and comprising:
    a. a pair of rectangular toasting plates with each having a top edge, a bottom edge and side edges;
    b. a plate hinge means joining the top edges of the toasting plates, to permit the plates to swing from the folded position to the open position;
    c. a heat shield at each end of the toaster to partially enclose the toaster when at the open position, with each shield having oblique side edges to join the adjacent side edges of the toaster plates at the open position;
    d. a heat shield hinge means joining one side edge of each heat shield with the adjacent side edge of one toaster plate;
    e. a latch means joining the other side edge of each heat shield with the adjacent side edge of the other toaster plate, said toaster being folded from its open position to its folded position by disconnection of each latch means to permit each heat shield to be folded at its heat shield hinge means against a toaster plate and the toaster plates to be folded together;
    f. heat release orifices in the face of the toasting plates; and
    g. a grid means at the face of the toasting plates to hold a piece of toast a short distance from the toasting plates.

2. A camping toaster as set forth in claim 1 wherein the toasting plate orifices are a series of slotted through holes with the holes being of larger dimension at the bottom of the plate and gradually diminishing to small holes toward the top of the plate in order to provide even dispersion of the heat from the stove or fire onto the item toasted.

3. In the toaster set forth in claim 1, wherein:
    said heat shield hinge means are spacer hinge means to permit the heat shields to lie upon the grid means in spaced parallelism with the toasting plates a short distance away from such plates.

4. In the toaster set forth in claim 1, said grid means comprising:
    wire rods protruding from the toaster plates a short distance from the plates to support the surface of a piece of toast placed thereon and
    flange means at the base of the toaster to support the edge of a piece of toast, said flange means including a vertical lip means at its outer edge to prevent the toast from slipping off the flange means.

* * * * *